United States Patent [19]

Fuller et al.

[11] 4,431,981
[45] Feb. 14, 1984

[54] PRESSURE UNIT ASSEMBLY

[75] Inventors: Nelson Fuller; Rudolph Bergsma, both of Ann Arbor, Mich.

[73] Assignee: Chrysler Corporation, Highland Park, Mich.

[21] Appl. No.: 421,220

[22] Filed: Sep. 22, 1982

[51] Int. Cl.³ .................................. H01L 10/10
[52] U.S. Cl. ........................ 338/42; 338/36; 338/296; 338/301
[58] Field of Search ............ 338/36, 42, 217, 218, 338/296, 301, 302, 304, 334; 73/725, 719

[56] References Cited

U.S. PATENT DOCUMENTS

| | | |
|---|---|---|
| 1,683,059 | 9/1928 | Van Deventer . |
| 2,244,958 | 6/1941 | Moross ........................... 201/55 |
| 2,439,092 | 4/1948 | Linstrom ......................... 201/48 |
| 2,466,846 | 4/1949 | Giesler .............................. 73/398 |
| 2,867,769 | 1/1959 | Hunt et al. ....................... 324/146 |
| 2,986,805 | 6/1961 | Jonke .......................... 338/218 X |
| 3,069,645 | 12/1962 | Henke ........................... 73/725 X |
| 3,080,757 | 3/1963 | Johansson ......................... 73/398 |
| 3,098,209 | 7/1963 | Stevens ........................ 73/725 X |
| 3,445,801 | 5/1969 | Sattler ............................... 338/42 |
| 4,079,351 | 3/1978 | Levine .............................. 338/36 |

Primary Examiner—C. L. Albritton
Attorney, Agent, or Firm—Newtson & Dundas

[57] ABSTRACT

A pressure unit assembly for providing an electrical signal representative of sensed pressure, for example an oil pressure unit assembly for an automobile engine. The unit is adapted for fabrication by automated equipment and it makes efficient use of constituent materials. Novel features of the unit include its spring contact element, its resistive element, and its electrical terminal configuration.

13 Claims, 5 Drawing Figures

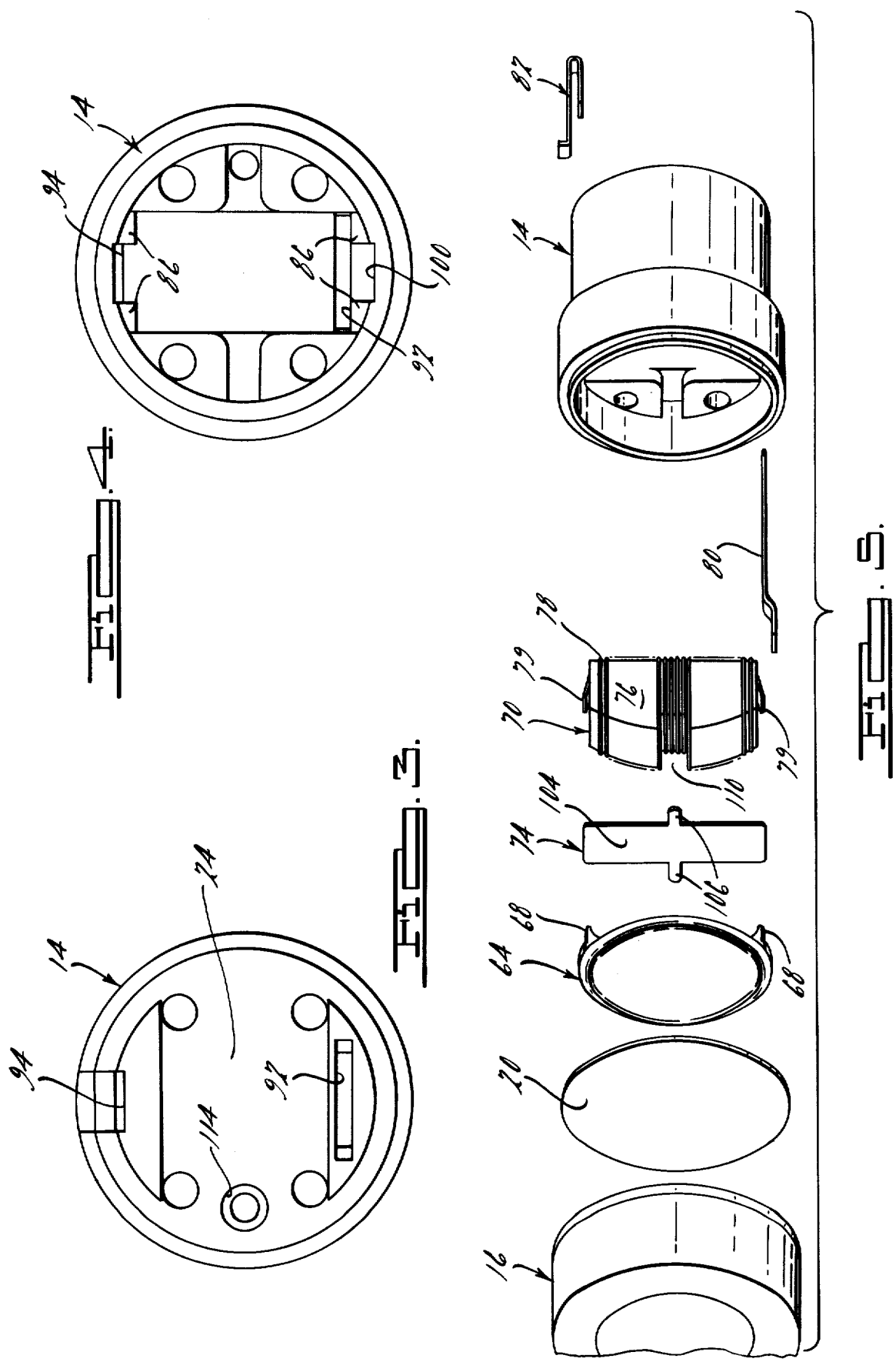

PRESSURE UNIT ASSEMBLY

BACKGROUND AND SUMMARY OF THE INVENTION

This invention relates generally to transducers and in the preferred embodiment relates to a pressure unit assembly for use in measuring the oil pressure of an automobile engine.

There are many instances where it is desirable to convert fluid pressure into a signal to convey pressure information to an observer or operator. For example, in the automotive field, an oil pressure unit may be mounted on the engine in communication with the outlet of the oil pump to monitor the pump pressure and convey an indication of this pressure to the operator of the vehicle. For example, one way of communicating this information is via an electric signal which is supplied from the pressure unit to an electrical gage on the vehicle's instrument panel. The gage displays an indication of the oil pressure to the vehicle operator.

The basic idea of a pressure unit is well known. A typical pressure unit comprises a pressure responsive element, often a flexible diaphragm, which is placed in communication with the sensed pressure. Within the pressure unit is a variable impedance whose effective impedance is a function of the movement of the pressure responsive element, and thus is an indication of sensed pressure. The prior art contains various patents disclosing this basic type of structure.

U.S. Pat. No. 2,439,092 in the name of Linstrom discloses a resistive element deposited in spiral fashion on one face of a flexible diaphragm. A spherical contoured contact element is adjustably spring biased toward, and in juxtaposition to, the face of the diaphragm which contains the spiral resistive element. The diaphragm is placed in communication with a source of pressure to be monitored, and the diaphragm is flexed in accordance with the sensed pressure to selectively engage the spiral resistive element with the spherically countoured contact element in an amount which is a function of the sensed pressure. In this way, selected portions of the resistive element are short circuited thereby providing an effective resistance of the unit which is indicative of sensed pressure.

U.S. Pat. No. 4,079,351 in the name of Levine discloses a pressure unit for use in sensing oil pressure in which a diaphragm is communicated to the pressure source and operatively coupled with a variable resistance. Calibration is by means of an adjusting screw.

U.S. Pat. No. 2,244,958 in the name of Moross discloses a pressure unit in one embodiment of which the resistive element is disposed on a convex contour, and the contact element is operated by a diaphragm device in cantilever fashion relative to the convex resistive element to thereby selectively short circuit the turns of the resistive element.

U.S. Pat. No. 3,080,757 in the name of Johansson discloses a pressure unit in which resistive elements are disposed on a flexible diaphragm and the diaphragm is selectively flexed against juxtaposed contact elements as a function of sensed pressure. This patent is similar to the Linstrom patent in that the resistive elements are disposed on the flexible diaphragm. A possible disadvantage of this type of construction is that the resistive elements might have a tendency toward failure because they must flex with the flexible pressure responsive diaphragm.

U.S. Pat. No. 2,867,769 in the name of Hunt et al discloses a pressure unit wherein a convexly curved spring element forms the contact element which selectively engages a wound resistor element. A calibration screw engages the spring element.

U.S. Pat. No. 3,445,801 in the name of Sattler discloses a pressure responsive unit containing a helically wound resistive element which is itself helically arranged within the pressure unit. A contact structure is operated by the pressure responsive diaphragm to selectively short circuit the turns of the resistive element to provide the pressure indicating signal.

U.S. Pat. No. 2,466,846 in the name of Giesler discloses a pressure responsive device where a convex surface is rocked against a wound resistor element to selectively short circuit turns of the resistor in providing the pressure indicating signal.

U.S. Pat. No. 1,683,059 in the name of Van Deventer discloses a variable resistance in which a shorting bar of convex contour is selectively shorted against a resistor bar as a function of the displacement of the contact bar. This latter patent discloses simply a resistor structure and is not shown in the context of a pressure unit assembly.

The present invention provides a number of significant improvements over the prior art as represented by the foregoing patents. One feature of the invention is that it provides an improved spring contact and resistor structure which offers convenient and accurate calibration in conjunction with good response and sensitivity, but without excessive manufacturing cost. The resistor is a separate unit which is inserted into a portion of the pressure unit body. The resistor has a convex surface on which the resistor wire is disposed. A spring contact element is provided within the unit and has a main contact portion generally diametrically disposed in relation to the axis of the unit and in juxtaposition to the convexly disposed resistor wire. The spring contact element is operatively coupled with a pressure responsive diaphragm to be urged against the resistor wire with increasing pressure. As the pressure increases, the amount of engagement of the spring contact elements with the resistor wire increases thereby short circuiting an increasing number of turns to provide a signal indication of sensed pressure. The spring contact element further includes projections which engage selective locations within the body of the unit. These projections bear against the unit's body to aid in supporting the spring contact element during its flexing against the resistive element. In the preferred embodiment the projections project away at 90° angles from opposite sides of the main contact portion. The distal end portion of one projection bears against a pad fashioned on the interior of the transducer body. The distal end of the opposite projection bears against the tip of a calibration screw which is threaded into a threaded bore on the transducer body. The calibration screw may be adjusted externally of the pressure unit to position the distal end of the projection and in this way the flexing characteristics of the spring contact element are varied by the setting of the adjustment screw and this in turn provides a calibration function whereby the unit may be conveniently and accurately calibrated externally of the unit. While external calibration adjustments are not per se new in the context of pressure units, the instant arrangement provides a novel and unique structure which is not seen to be present in the prior art described above. Moreover, the spring contact and resistor arrangement represents new and unique structure not to be found in this prior art.

A further significant feature of the pressure unit of the present invention is that the terminal arrangement is of improved constuction. In this regard, the resistor element which was indicated to be a separate unit above, includes intermediate electrical terminals which are embedded in the core on which the resistive element is disposed. The ends of the resistive element are electrically joined by suitable means to the portions of the intermediate terminals which are embedded in the resistive core. During assembly of the resistor into the body of the pressure unit, pressure termination occurs between intermediate terminal and external terminals and it is unnecessary to be concerned about making connections for the ends of the resistive wire to other portions of the unit structure. Furthermore, one external terminal, (ungrounded) and the body are configured such that when the resistor is assembled into the body that external ungrounded terminal projects through a corresponding aperture in the wall of the body so as to become available externally of the unit for connection to an external electrical circuit. The other external terminal (the ground side) extends from the other intermediate terminal within the body and projects through a corresponding aperture in the wall of the body so as to become secured in electrical contact with the electrically conductive fitting via which the pressure unit mounts on an engine. This fitting is threaded into a corresponding tapped hole in the engine and provides a passage via which pressure is communicated to the diaphragm, and the fitting provides a ground path to the engine. Prior art patents above do not disclose a terminal arrangement of this type.

A further feature believed to be unique not only in the context of a pressure transducer but more generally in resistor devices per se is the resistor structure which includes on the convex core surface a notch within which a portion of the resistive element is disposed. By so locating a portion of the resistor within the notch, the signal provided by the unit can exhibit a larger initial step. This particular feature is not disclosed in any of the above-mentioned patents.

Further features of the invention include its less complex construction than many other types of commercial pressure units. It is adapted for automated fabricated and can be manufactured on a much more competitive basis. The pressure unit also makes efficient use of material and has weight advantages. Other ancillary features which will be described in more detail hereinafter also contribute to improvements in the pressure unit.

The foregoing features, advantages and benefits of the invention, along with additional ones, will be seen in the ensuing description and claims which should be considered in conjunction with the accompanying drawings. The drawings disclose a preferred embodiment of the invention in accordance with the best mode presently contemplated in carrying out the invention.

BRIEF DESCRIPTION OF THE DRAWINGS

FIG. 3 is a right-hand axial end view of Body Element 14 of FIG. 1.

FIG. 4 is a left hand axial view of Body Element 14 of FIG. 1.

FIG. 5 is an isometric exploded view of the pressure unit.

DESCRIPTION OF THE PREFERRED EMBODIMENT

Figure 1:
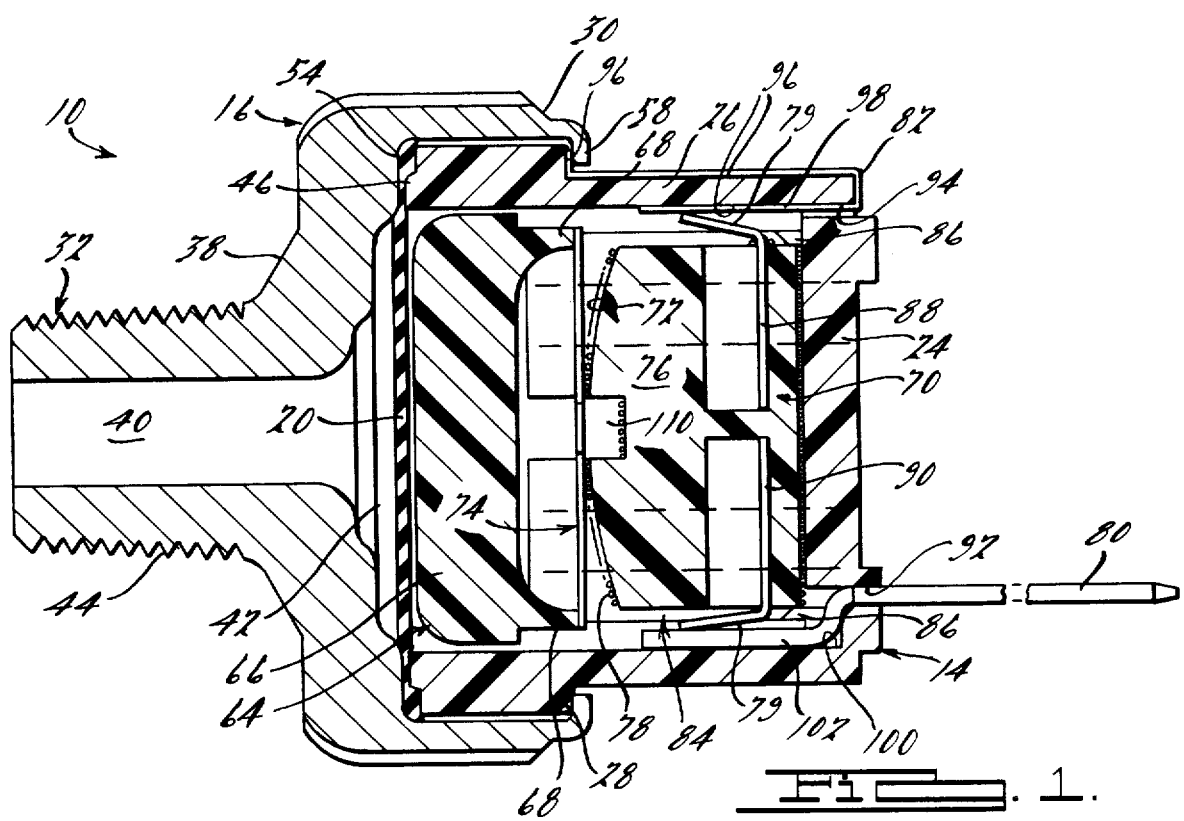
FIG. 1 is a longitudinal sectional view through a pressure unit embodying principles of the present invention.
Figure 2:
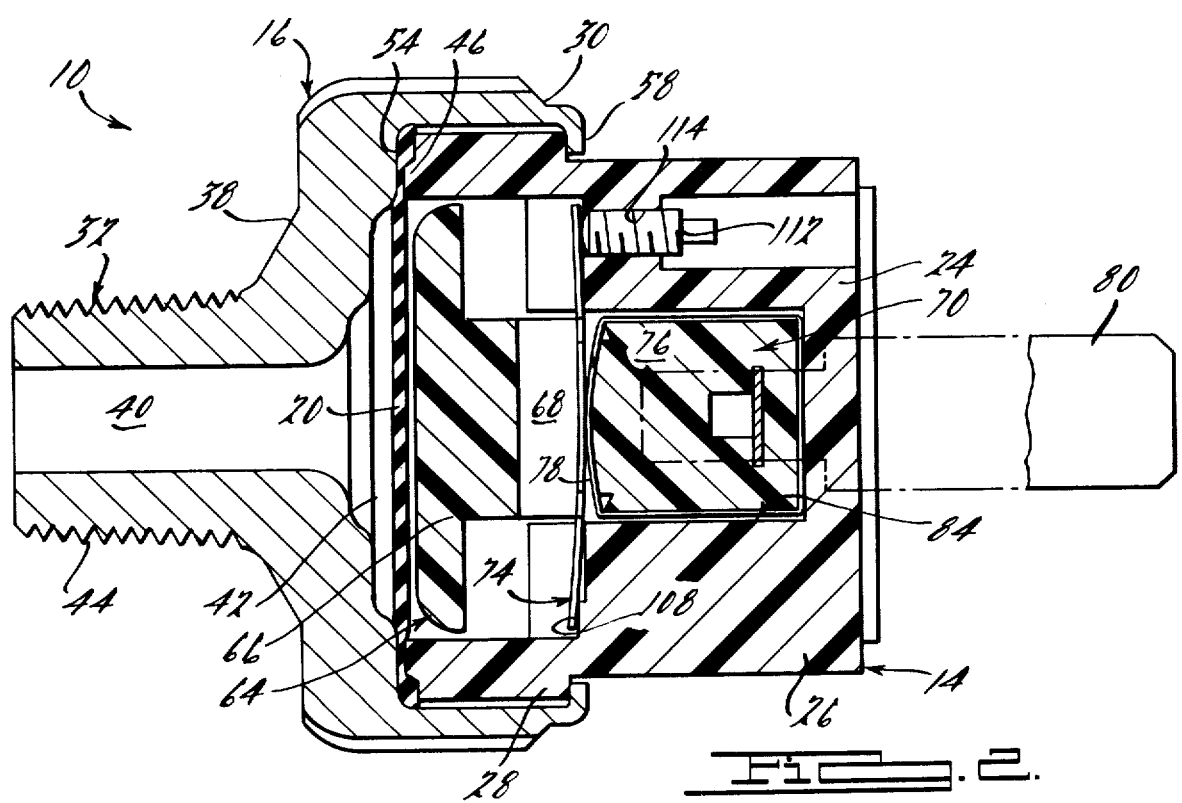
FIG. 2 is another longitudinal sectional view taken at 90° relative to the view of FIG. 1.

In FIGS. 1 and 2 a pressure unit assembly 10 embodying principles of the present invention is shown to comprise a body which comprises two main body elements 14 and 16. The first element 14 is a molded plastic element, and hence electrically non-conductive, while the second body element 16 is an electrically conductive metal. The unit further includes a diaphragm 20.

Body element 14 is of generally cylindrical shape having an end wall 24 at the right-hand end of the unit as viewed in FIGS. 1 and 2, a side wall 26 which extends from end wall 24 to the left as viewed in the drawing figures and a diaphragm retaining flange 28 which extends around the outside of side wall 26 at the furtherest left-hand end thereof as viewed in the drawing figures. The second body element 16 is of single piece construction and comprises a collar section 30 and a shank section 32 both of which are of generally circular cylindrical configuration. Shank section 32 includes a shoulder 38 and a bore 40 to allow communication of pressurized fluid through the fitting to a pressure chamber 42 defined within the pressure unit by collar section 30 and diaphragm 20. The distal portion of shank section 32 is provided with an external screw thread 44 which allows the unit to be mounted on an engine, the unit screwing into a similarly tapped hole in the engine block at a point where the pressure from the end oil pump is communicated via bore 40 to the pressure chamber 42.

The diaphragm retainer flange section 28 of body element 14 is a generally annular element having a diaphragm retainer bead portion 46 extending around the flange but spaced radially inwardly from the outer edge of the flange. Collar section 30 has a generally U-shaped cross section and includes a crimping portion 58, a radial pad 54, and a pressure chamber 42. In the completed unit the outer peripheral margin of diaphragm 20 is securely held between pad 54 of the collar 30 and the bead 46 of the retainer flange section 28 of body element 14. Bead 46 is useful in that it provides a positive means of effecting a sealing contact between the pad 54 and the margin of the diaphragm so that pressure fluid in chamber 42 does not leak out between the two. The construction is such that crimp ring 58 secures the elements shown in assembled relationship, diaphragm retainer 28, diaphragm 20 and radial pad 54 together; body elements 14 and 16 are thereby held together. Prior to completion, the crimp ring portion 58 is essentially colinear. Fabrication is completed by crimping the crimp ring 58 radially inward.

Secured within the unit to the movable portion of diaphragm 20 is an actuator 64. Actuator 64 comprises a central circular disc portion 66 and a pair of fingers 68. The fingers are diametrically opposed and symmetrical with respect to the axis of the pressure unit.

Within the right-hand end of the pressure unit is a variable resistor designated generally by the reference numeral 70. Resistor 70 comprises a spring contact element 74, an insulative core 76, a resistor wire 78 and a pair of intermediate terminals 79. Communicating with intermediate terminals 79 and 81 are external terminals 80 and 82. The right-hand end wall 24 of body element 14 is fashioned with a rectangularly shaped pocket 84 into which resistor 70 is inserted. There are guides 86 at the top and bottom as viewed in FIG. 1, of the pocket 84 to assist in locating the resistor 70 in the pocket. The resistor core 76 includes a pair of sockets 88 and 90 for the intermediate terminals 79. The end wall 24 includes apertures 92 and 94 through which the exposed portion of external terminals 80 and 82 extend in the completed unit.

There is a groove 96 extending in the interior and exterior surface of side wall 26 and flange 28 which accommodates terminal 82. Portion 98 of terminal 82 slidably contacts intermediate terminal 79 thereby forming an electrical connection. Groove 96 is best seen in FIGS. 3 and 4. In a similar fashion, groove 100 extends in the interior of side wall 26 accommodating portion 102 of terminal 80. Portion 102 slidably contacts intermediate terminal 79 thereby forming an electrical connection. It will also be observed in FIG. 2 that the resistor wire 78 is disposed on a convex surface 72 of core 76 and itself has a convex shape.

Spring contact element 74 is preferably of one piece construction. The overall shape of spring contact 74 perhaps can best be seen in FIG. 5. It comprises a generally rectangular main portion 104 which is disposed generally diametrically of the unit and in direct justaposition to the resistor wire 78 disposed on the convex surface 72. Projecting away from the main portion are a pair of distal projections 106 one of which bears against pad 108 (FIG. 2) while the distal end of the other projection bears against the rounded tip of an adjustment screw 112 which is threaded into an aperture 114 in body element 14. In use, the distal ends of the projections 106 bear against pad 108 and screw 112 respectively to assist in supporting the spring contact during flexing thereof by actuator 64. As can be seen best in FIG. 2 the fingers 68 apply force to the main portion 104 which flexes against the resistor wire to provide an indication of sensed pressure. As the actuator is increasingly displaced as the pressure increases, the spring contact 74 is increasingly flexed to increase its selective engagement with the individual wire turns. The spring contact 74 has a much lower resistance than the resistor wire and hence this acts to short out these turns of the resistor wire which are bridged by the contact element 74. This means that the number of turns shorted out is a function of the intensity of sensed pressure and hence the effective resistance appearing across the resistor unit between external terminals 80 and 82 is an indication of the sensed pressure. By connecting the terminals in a suitable gage circuit a signal indication may be given to the operator representative of sensed oil pressure. The initial resistance reading appearing between the external termainals 80 and 82 is a step function of the number of wires contained in notch 110 and the position of adjustment screw 112. The combination of the number of wires 78 in notch 110 and the position of adjustment screw 112 provides for a very accurate, easy to perform calibration.

We claim:

1. In a pressure transducer having a housing defining an enclosed interior position, the pressure transducer which comprises a pressure responsive element which varies an electrical characteristic of an electrical circuit element in accordance with sensed pressure, the improvement which comprises a generally flat but resiliently flexible spring contact element for varying the electrical characteristic of said electrical circuit element comprising a main contact portion disposed in a diametrical sense with respect to the axis of the transducer and at least one projection which projects in a radial sense from a central region of the main contact portion in a direction which is non-parallel to the diametrical sense of the main contact portion and wherein said electrical circuit element comprises a resistance which is distributed in a general diametrical sense with respect to the axis of the transducer, but which is convex toward and in juxtaposition to said main contact portion, and wherein said spring contact element is disposed to be resiliently flexed by the pressure responsive element with the main contact portion being flexed into selective contact with said resistance in accordance with sensed pressure and with the free end of said at least one projection bearing against an interior portion of said housing to aid in supporting the spring contact element during flexing.

2. The improvement set forth in claim 1 wherein said at least one projection comprises a pair of projections which project from opposite sides of said main contact portion at right angles to the length of said main contact portion.

3. The improvement as set forth in claim 1 including adjustment means on the transducer engageable with said at least one projection for adjusting the deflection characteristic of said spring contact element.

4. The improvement set forth in claim 3 wherein said adjustment means is disposed to aid in supporting the spring contact element during flexing.

5. The improvement set forth in claim 4 further including an actuator disposed to operatively couple the pressure responsive device with the spring contact element and which applies flexing force to the spring contact element at locations on the main contact portion which are spaced from the central region thereof.

6. The improvement set forth in claim 5 wherein the flexing force is applied symmetrically with respect to the axis of the transducer and the resistance is disposed symmetrically with respect to the axis of the transducer with the convex surface thereof being generally tangent to a plane perpendicular to the axis of the transducer.

7. The improvement set forth in claim 6 including an indentation in said resistance at the location at which said point of tangency occurs whereby a central portion of the resistance is disposed where it cannot be contacted by said main contact portion during flexing of the spring contact element.

8. In a pressure transducer which comprises a pressure responsive element and an electrical resistance element whose effective resistance is a function of pressure sensed by said pressure responsive element, the improvement which comprises said resistance element being diposed in a generally diametrical sense with respect to the axis of the transducer but which is convex toward one axial end of the transducer and including a spring contact element which is disposed in a generally diametrical sense with respect to the axis of the transducer and in juxtaposition to said resistance element and which is resiliently flexed by the pressure responsive element to selectively contact said resistance element in accordance with sensed pressure.

9. The improvement set forth in claim 8 wherein said resistance element is convex toward said spring contact element.

10. The improvement set forth in claim 9 wherein said resistor element is disposed as a winding on a support element with the support element having a convex surface on which the resistor element is disposed to thereby render the resistor element convex toward one axial end of the transducer.

11. The improvement set forth in claim 10 including an indentation in the convex surface of said support element with a portion of said resistor element being disposed within said indentation so as to be unavailable for contact by said spring contact element during flexing thereof.

12. The improvement set forth in claim 11 wherein said indentation is disposed at the axis of the transducer and the spring contact element is flexed against the resistance element by forces which are applied to said spring contact element at opposite diametrical points with respect to the indentation in the support element.

13. The improvement set forth in claim 12 wherein said support element includes an electrical terminal embedded therein and connected with said resistance element providing for connection of the transducer in an external electrical circuit.

* * * * *